July 22, 1924.

G. H. BROWN 1,502,420

CHANGE SPEED BELT GEARING

Filed Oct. 12, 1923

G. H. BROWN 1,502,420

CHANGE SPEED BELT GEARING

Filed Oct. 12, 1923 6 Sheets-Sheet 3

Inventor
George Highfield Brown
by P. Singer, atty.

July 22, 1924.

G. H. BROWN 1,502,420

CHANGE SPEED BELT GEARING

Filed Oct. 12, 1923    6 Sheets-Sheet 5

Inventor
George Highfield Brown
by B. Singer

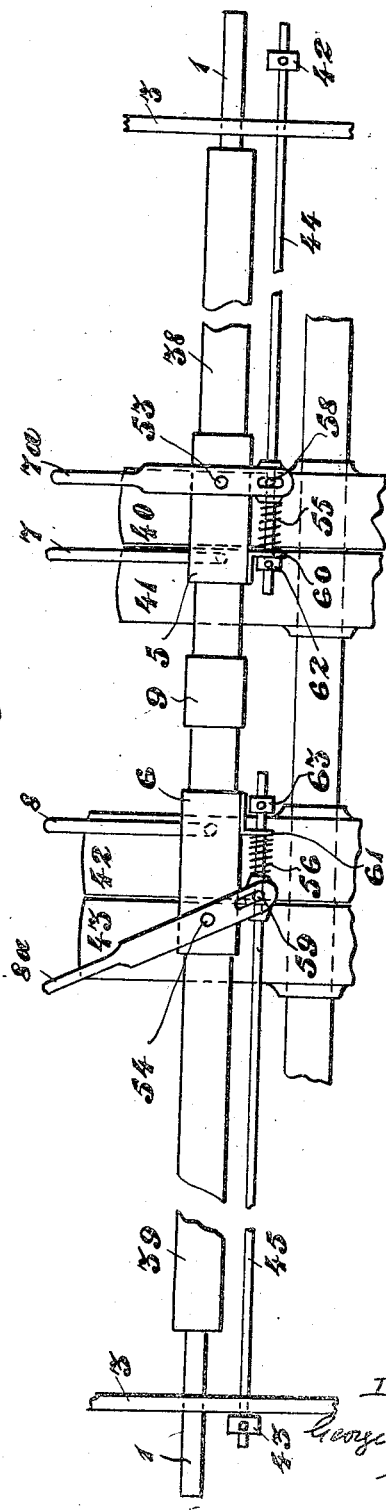

Patented July 22, 1924.

1,502,420

UNITED STATES PATENT OFFICE.

GEORGE HIGHFIELD BROWN, OF MARKET HARBOROUGH, ENGLAND.

CHANGE-SPEED BELT GEARING.

Application filed October 12, 1923. Serial No. 668,210.

*To all whom it may concern:*

Be it known that I, GEORGE HIGHFIELD BROWN, a subject of the Kingdom of Great Britain, residing at 29 Coventry Road, Market Harborough, in the county of Leicester, England, have invented Improvements in or Connected with Change-Speed Belt Gearing, of which the following is a specification.

This invention relates to change speed belt gearing, and chiefly, though not exclusively, refers to the kind employed in conjunction with semi or full automatic screw machines and for the purpose of the present description will be assumed to be applied to such machines, by way of example.

In machines of the type referred to, where a number of operations are carried out consecutively, it is often desirable or necessary to decrease or increase the machine speed for the duration of one or more operations.

While this is accomplished in some machines by the employment of a change speed gear box, built integrally with the machine, many are not provided with such gear, and utilise the countershaft in conjunction with friction clutches to provide two different countershaft or machine speeds.

Now it is the object of the present invention to provide an improved form of countershaft automatic belt-striking gear, as will be hereinafter described.

The device consists of a simple attachment which can be fitted to any countershaft, and comprises two sets of fast and loose pulleys and belt forks, conveniently arranged and adapted to be operated through the medium of rods and levers, or the like, by a single cam placed in a convenient position on the machine. The said device operates between the main driving shaft and the countershaft of the machine, and provides two countershaft speeds, and incorporates means whereby the machine may be started and stopped as desired.

In a convenient embodiment of the invention, a rod is provided which runs parallel and in close proximity to the countershaft, and is supported by, but free to slide through, stop plates rigidly attached to the countershaft hangers. Mounted on this rod, in a slidable manner, are belt forks carried on blocks, which are pressed towards each other by the compression of two spiral springs which slide over the rod from each end, and press on the outer ends of the belt fork blocks.

These two blocks, under the pressure from the springs, embrace at their inner ends the bifurcated end of a member which can be operated from a cam on the feed shaft of the machine through the medium of rods and levers in a well known manner.

The belt forks and blocks move together as a unit, upon motion being imparted thereto by means of the bifurcated member, and cam above mentioned, and they are pivotally connected together by links or the like, the apex or hinge of the said links being connected to a U-shaped link, the lower end of which is connected to a rod, and starting and stopping handle. A downward pull on this handle will start the machine as will be hereinafter described.

In the following further description, reference will be made to the accompanying drawings, in which:—

Figures 6, 7 and 8 illustrate a modification wherein one of the limbs of a forked member is yieldingly mounted in relation to the other limb.

Figure 1:
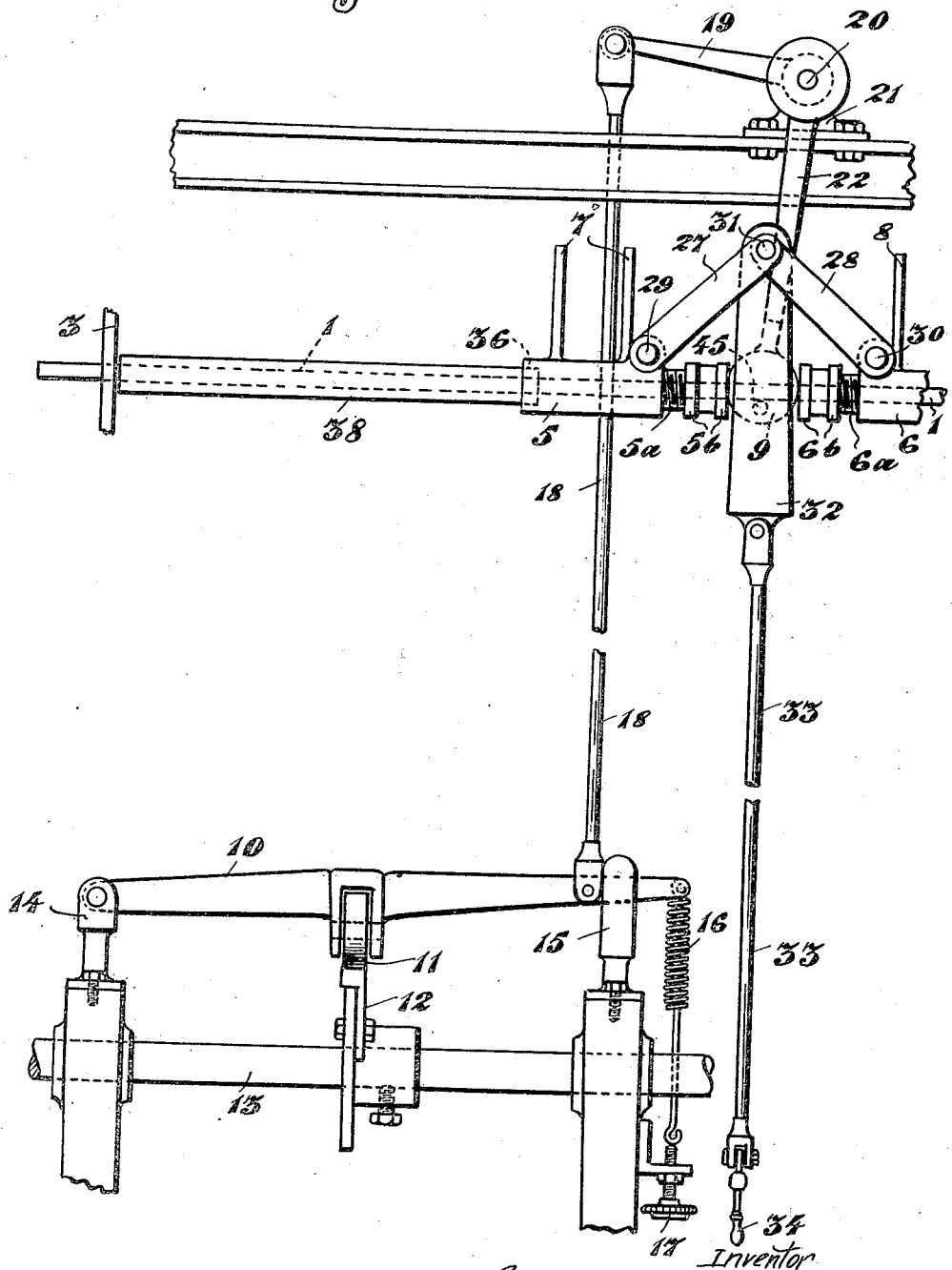
Figure 1 is a front elevation of a convenient form of the device, comprising my invention, showing a method of imparting the to and fro motion of the striker gear.

In the concrete embodiment of the invention illustrated, a rod 1 is provided which runs parallel and in close proximity to the countershaft 2, and is supported by but free to slide through stop plate 3 rigidly attached to the countershaft hangers 4.

Mounted on the rod 1 in a slidable manner are two blocks 5 and 6, provided with screwed portions 5$^a$ and 6$^a$ and locking nuts 5$^b$ and 6$^b$. These blocks 5 and 6 carry the belt forks 7 and 8 and are operated on by a cylindrical bifurcated member 9 to which movement is imparted by any well known means.

Figure 2:
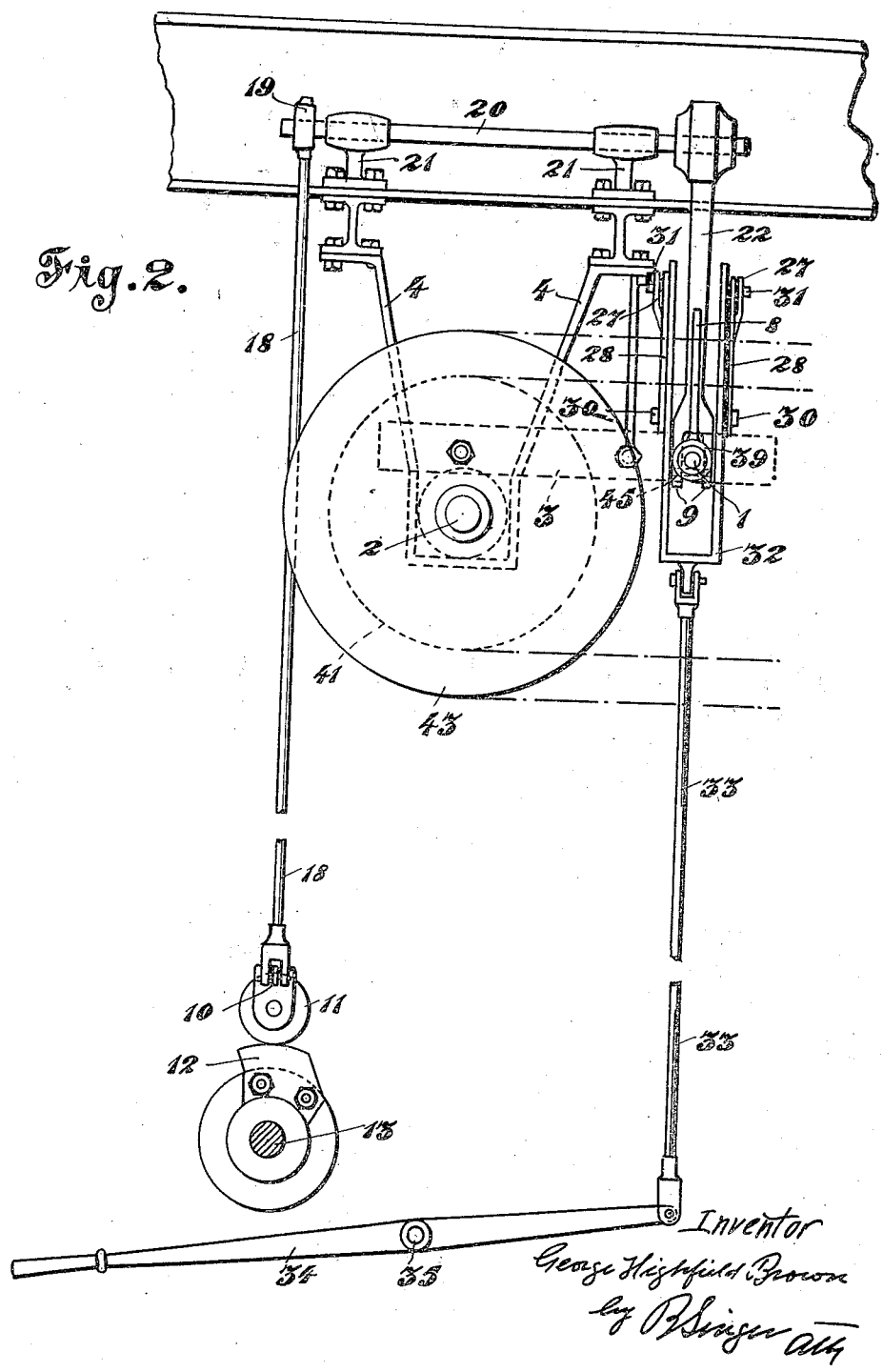
Figure 2 is an end view of the same.

A convenient method of imparting movement to the belt and forks is shown in Figures 1 and 2 wherein a horizontally disposed lever 10 is provided at or near its centre with a roller 11, adapted to ride on a cam 12 on the feed shaft 13 of the machine.

The before mentioned lever 10 is pivoted at one end to a bracket 14 mounted on the frame of the machine, and the other end thereof works in a suitable slotted guide bracket 15, also mounted on the frame.

A spiral spring 16 having an adjustable tension by means of a nulled screw 17 retains the lever in a normal downward position in engagement with the said cam. The cam is of such form as to give the lift and duration regained to the lever, and it is adjustable on the shaft 13 of the machine, so that it may operate at predetermined intervals.

Instead of using a spring such as 16 to hold the lever 10 in engagement with the cam 12, the lever may be moved positively in both directions by a suitable cam.

Figure 5:
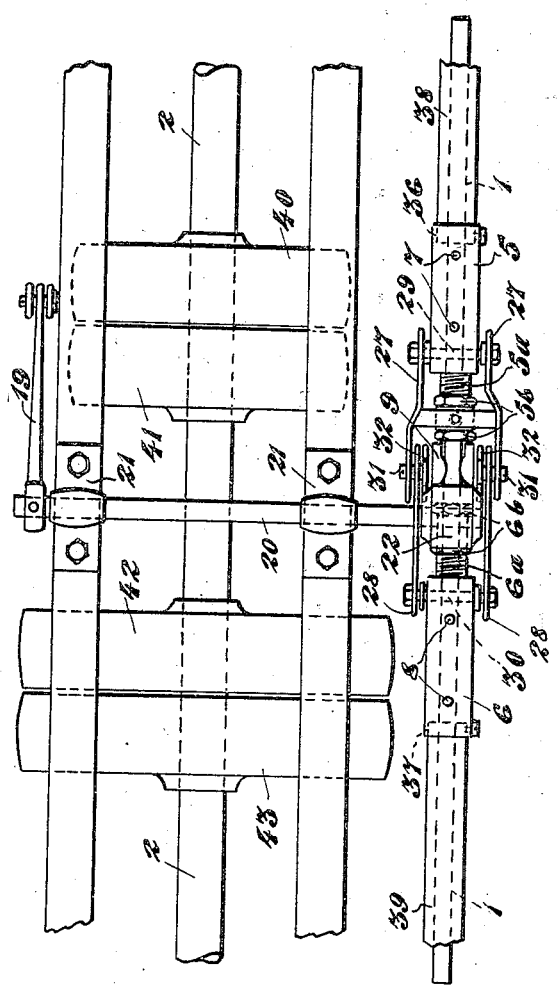
Figure 5 is a plan of the device.

A vertical rod 18 is pivotally connected to the lever near its free end, the other or upper end of said rod being attached to a crank 19 mounted on a horizontal cross-shaft 20 carried in bearings 21 and disposed above at right angles to the countershaft and rod 1 as shown in Figures 2 and 5.

It is to be understood that the parts 10 to 21 first referred to are described and shown as forming a convenient arrangement for adoption in applying my invention to an automatic screw machine, and are therefore not to be considered in a limited sense, as in applying the invention to other machines it may be necessary or desirable to modify said parts, or to use others in place thereof.

Mounted on the cross-shaft 20 is the vertically disposed crank or lever 22, on the lower end of which is mounted the bifurcated member 9. This bifurcated member is held between the above mentioned lock nuts 6^b and 5^b which are pressed against and kept in contact with the said member by means of spiral compression springs 23 and 24—Figure 3—arranged round the rod 1 and held by collars 25 and 26 on the said rod.

The above mentioned blocks 5 and 6 carry two twin links 27 and 28 hinged on pins 29 and 30 respectively, the free ends being pivoted together at 31, the pin 31 acting as the apex of a triangle 29, 31, 20.

From the pin 31 hangs a U-shaped link 32, the internal width of which is such that it acts as a guide for the bifurcated member, and also provides additional stability; from the lower end of this U-shaped link is suspended a rod 33 to which is attached a starting and stopping handle 34 pivoting about midway of its length on a pin 35 attached to the machine, as shown in Figure 2.

Screwed in counterbores 36 and 37 in the outer ends of blocks 5 and 6 are tubes 38 and 39, which are a sliding fit over the springs 23 and 24 and collars 25 and 26.

Figure 3:
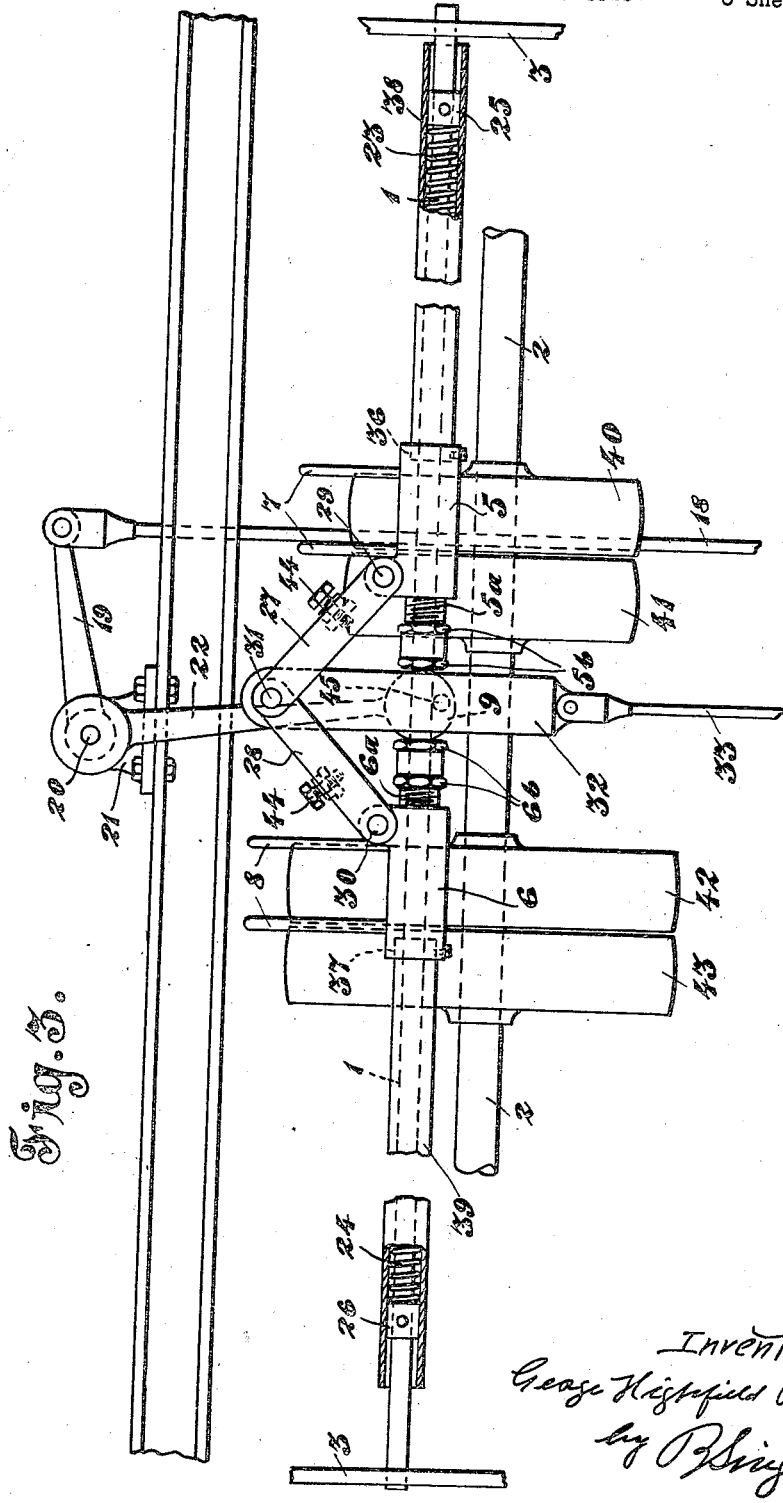
Figure 3 is a rear elevation of the device in its normal operative position—driving on one set of pulleys and running idle on the other set.

These tubes are of such a length that when the striker is moved to its full extent the tube at the end to which the striker has moved butts against its respective stop-plate, the other tube moving away from its stop-plate to the extent of a belt width, as shown in Figure 3.

Two sets of fast and loose pulleys 40, 41, 42 and 43 are provided on the countershaft as shown in Figures 2, 3, 4 and 5, one set in the illustration being of a larger diameter than the other set, to differentiate between the two speeds required. Or, the pulleys on the countershaft may be of equal size and be driven from pulleys of different sizes on the main shaft, according to the speeds required.

The two pulleys 40 and 43 are loose, and the pulleys 41 and 42 are fast.

In the operation of the device, when it is required to change the speed of the machine, the cam 12, Figure 1, acts upon the roller 11 and cam 10 which causes the bifurcated member 9, the blocks 5 and 6, and the belt forks thereon, the tubes 38 and 39, the springs 23 and 24, the collars 25 and 26, and the rod 1, to move to the left as a unit, until the tube 38 engages or butts against the stop-plate 3. At this point the cam 12 has reached its highest point.

Provision may be made, for instance, by moving the hangers carrying the stop-plates 3 inwards or outwards, or by altering the length of the tubes 38 and 39, so that the contact of the said tubes with the stop-plates is coincident with the cam 12 reaching its highest point. This action moves the driving belts onto the small loose pulley 40 and the large fast pulley 42, and this decreases the speed of the machine.

Upon the cam 12 revolving and leaving the roller 11, the spring 16 acts upon the arm 10 and the action is reversed. The driving belts moving onto the small fast pulley 41 and large loose pulley 43 which increases the speed of the machine.

Figure 4:
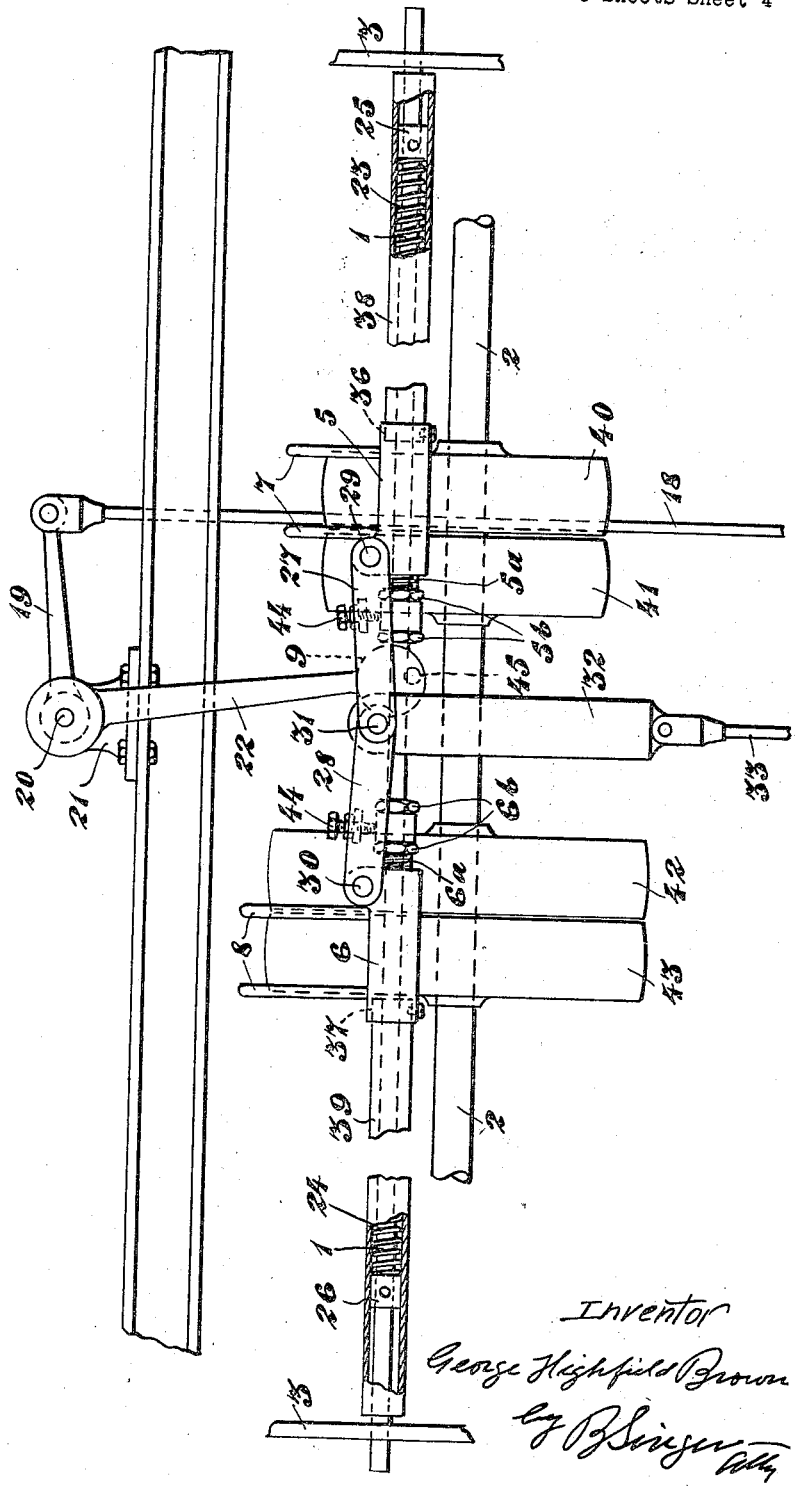
Figure 4 is a similar view to Figure 3 but showing both sets of pulleys idle.

When it is required to stop the machine, the starting and stopping handle 34 (Figure 2) is moved upwards, which pulls rod 33 downwards, which subsequently causes the fork of the driving belt to move away from the other fork so that both belts run on their loose pulleys as shown in Figure 4.

Assuming as in Figure 3 that the countershaft is being driven on low gear, the block 5 and its tube 38 are held imprisoned between the stop-plate 3 and the bifurcated member 9. It will now be evident that a downward pull on rod 33, as aforesaid, to the apex of the link triangle at the point 31, will cause the point 30 of the triangle to move away from the other point 29, and as the latter must remain stationary, being on the block 5 which is imprisoned as hereinbefore mentioned, the point 30 will move outwards carrying the block 6, and the belt fork and tube 39 thereon until the said tube makes contact with its stop-plate 3, as shown in Figure 4, when the driving belt is moved onto the loose pulley 43, thus stopping the machine.

Adjustable screw stops 44 are provided on the links 27 and 28 to limit the downward pull of the rod 38, and a pin 45 passing across the slot in the bifurcated member, and immediately under the rod 1 counteracts any bending strain on the said rod during the downward pull of the links.

Upon the starting handle 34 being depressed, the reverse action takes place, and the compression spring 24 returns the block 6 and tube 39 to its former position, as shown in Figure 3.

Had the high speed been in operation, i. e. the driving belts running on the fast pulley 41 and loose pulley 43, the movement of the arm or lever 34 would have been imparted to the block 5 and tube 38 owing to the altered position of crank 22.

The blocks 5 and 6 are drilled for forks top and bottom so as to control belts running in either direction or one up and one down for one forward speed and a reverse.

Figure 6:
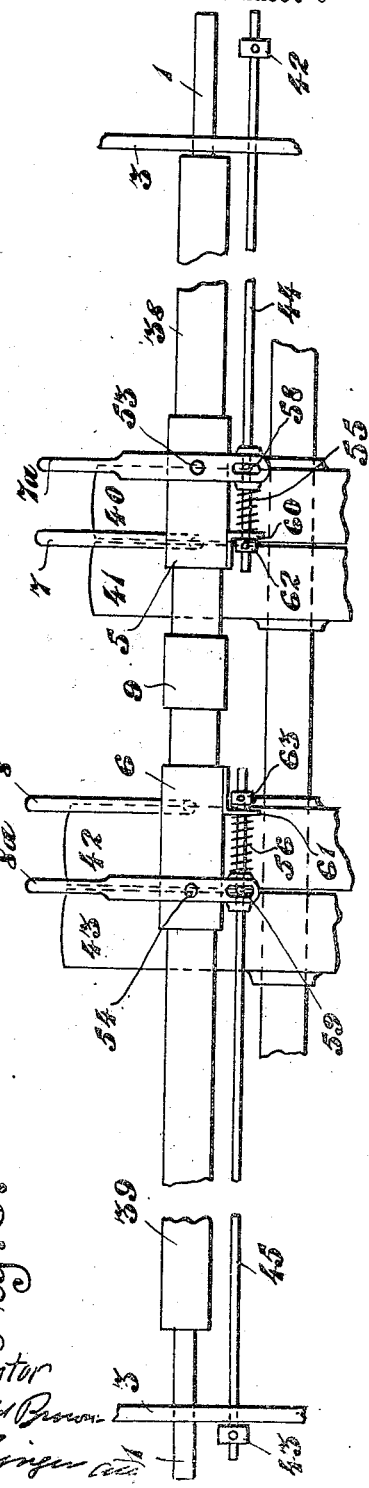

Referring to Figures 6, 7 and 8, there is illustrated a modification wherein one limb of each forked member 7 and 8 is pivoted at a point along its length to the members 5 and 6 respectively, in such a manner that the lower end of the said fork is provided with a slot which engages with pins 58 and 59 carried upon rods 44 and 45, which rods are mounted parallel to the countershaft 1, and are slidable in bearings in the plate 3 and in the brackets 60 and 61 mounted upon the members 5 and 6 respectively.

Secured between the pins 58 and 59 and the brackets 60 and 61, are springs 55 and 56, which enable one of the limbs of the members 7 and 8 to be moved about their pivots under the influence of the said pins. The amount of movement to which the said arms are capable is restricted by stops which engage with the movable limbs of the forked members 7 and 8.

What I claim as my invention and desire to secure by Letters Patent is:—

1. Change speed belt gearing, comprising, in combination, two sets of fast and loose pulleys on a countershaft or equivalent member, and arranged to give different speeds thereto, a movable belt fork for controlling the driving belt of each set, means yieldingly connecting the belt forks so that they form a unit, and can be moved simultaneously to change the drive from one fast pulley to the other, a device operable from a cam to move said units in pre-arranged manner to automatically determine which fast pulley is to be driven, and means common to both belt forks and operable at will, whereby the fork controlling the belt from which the drive is at the time being taken can be moved relatively to the other fork for the purpose of stopping and starting the countershaft or member.

2. Change speed belt gearing as claimed in claim 1, wherein the cam operated device, in conjunction with a suitable stop, locks the belt fork which is to remain stationary, and places the other fork under the control of the stopping and starting means.

3. Change speed belt gearing as claimed in claim 1, wherein the two belt forks are slidably mounted upon a rod and pressed towards each other by springs thereon, said rod being carried by means which permit endwise movement thereof, said forks and rod being movable in company with each other, by a device operating between the forks and being in turn actuated by connections from a controlling cam and the two forks are connected by pivoted means which are adapted to be actuated by connections from a hand lever, and to turn on a fulcrum on one fork and cause the other fork to move along the rod.

4. Change speed belt gearing as claimed in claim 1, wherein the movement of the belt forks in relation to the loose pulleys is determined by stop devices.

5. Change speed belt gearing, as claimed in claim 1, wherein one of the limbs of the forked members is yieldingly mounted relatively to the other member of the fork.

In witness whereof I have hereunto set my hand.

GEORGE HIGHFIELD BROWN.